(12) United States Patent
Alberti

(10) Patent No.: US 6,276,127 B1
(45) Date of Patent: Aug. 21, 2001

(54) NOISE SUPPRESSING MIXER FOR JET ENGINES

(76) Inventor: John R. Alberti, 442 7$^{th}$ Ave. S., Kirkland, WA (US) 98033

( * ) Notice: Subject to any disclaimer, the term of this patent is extended or adjusted under 35 U.S.C. 154(b) by 0 days.

(21) Appl. No.: 09/338,246

(22) Filed: Jun. 22, 1999

(51) Int. Cl.$^7$ .................................................. F02K 1/38
(52) U.S. Cl. .................................................. 60/262
(58) Field of Search .................... 181/213, 214; 60/262; 239/265.17, 265.19

(56) References Cited

U.S. PATENT DOCUMENTS

| | | | |
|---|---|---|---|
| 4,077,206 | * | 3/1978 | Ayyagari ................................. 60/262 |
| 4,149,375 | * | 4/1979 | Wynosky et al. ...................... 60/262 |
| 4,335,801 | * | 6/1982 | Stachowiak et al. ................ 181/213 |
| 4,401,269 | * | 8/1983 | Eiler ................................. 239/265.17 |
| 4,543,784 | * | 10/1985 | Kirker ................................... 60/262 |
| 5,262,807 | * | 11/1993 | Steckbeck et al. ............. 239/265.11 |
| 5,638,675 | * | 6/1997 | Zysman et al. ....................... 60/262 |
| 5,884,472 | * | 3/1999 | Presz, Jr. et al. ..................... 60/262 |
| 6,082,635 | * | 7/2000 | Seiner et al. .................... 239/265.19 |

* cited by examiner

Primary Examiner—Timothy S. Thorpe
Assistant Examiner—William H Rodriguez
(74) Attorney, Agent, or Firm—Robert W. Jenny

(57) ABSTRACT

The mixer has a circular forward end which is attached to the exit of a jet engine, or the core of a bypass engine. The mixer has radial lobes which increase in their radial dimension with increasing distance aft of the forward end. There are corrugations, termed circumferential lobes, in the after portions of the walls of the radial lobes. These circumferential lobes increase the ratios of wetted areas to cross sectional areas of the passageways through the mixer. Also, the dimensions of these lobes are small relative to the radius of the mixer.

6 Claims, 3 Drawing Sheets

NOISE SUPPRESSING MIXER FOR JET ENGINES

BACKGROUND OF THE INVENTION

1. Field

The subject invention is in the field of equipment and apparatus for reducing the perceivable noise produced by the effluent from gas turbine engines, i.e. jet engines. More particularly, it is in the field of lobed mixers used for suppressing the noise caused by jet engine effluent. Limits on the perceived noise produced by jet engines on airplanes are continuously becoming more restrictive and more prevalent with sophisticated noise measuring systems installed at many airports to enforce the restrictions.

2. Prior Art

The U.S. Patents listed below provide a sample of the prior art in this particular field:

| | |
|---|---|
| 3,153,310 | 4,835,961 |
| 4,077,206 | 4,909,346 |
| 4,148,878 | 5,216,879 |
| 4,819,425 | 5,638,675 |

There is also applicable prior art in a NASA report: NASA CR114584 titled "Task V Noise Suppression Of Improved Augmentors For Jet Stol Aircraft." This report describes a flat array of rectangular corrugations with a relatively hotter and higher velocity gas mixture flowing on one side of the corrugations and relatively cooler, lower velocity air flowing on the other side, as different from having the two flows separated by a flat plate. Tests indicated that the corrugations augmented mixing of the two flows and it is well known in the art that such mixing reduces perceivable noise produced by the effluent. It is also known in the art that the amount of suppression increases with increases in the ratio of wetted areas of the passageways involved to the cross sectional areas of the passageways and with decreasing width dimensions of the convolutions of the passageways.

In view of these facts and the need for improved suppression of the perceivable noise produced by jet engines, the primary objective of the subject invention is to provide a jet engine noise suppressing mixer having passageways having relatively high ratios of wetted areas to cross sectional areas in its passageways and having corrugations in the passageways having relatively small width dimensions relative to the radius of the mixer.

SUMMARY OF THE INVENTION

The subject invention is a noise suppressing mixer for jet engines. It is installed on an engine so that the effluent from the engine passes through it and, because of the configuration of the mixer, is mixed with ambient or bypass air flowing over the mixer. The mixer is circular at its forward end and becomes radially lobed with the radial dimensions of the lobes increasing to a point downstream, i.e. aft, of the forward end. At that point circumferential lobes in the radial walls of the radial lobes are initiated with the circumferential dimensions of these lobes increasing fairly uniformly with increasing distance aft.

In a typical embodiment of the mixer the radial width of the circumferential lobes is in a range of ½ to ⅛ the circumferential width of the radial lobes. As an example there may be 5 to 20 circumferential lobes on each side of a radial lobe. Also, the maximum radial dimension (width) of the circumferential lobes is in a range of 0.015 to 0.15 of the maximum radius of the mixer with a range of 0.025 to 0.050 preferred. There may be a plug in the mixer (a streamlined shaped body) occupying the center or core of the mixer or the lobes may extend close to the center of the mixer. In such an embodiment the circumferential lobes may be confined to the outer ⅓ to ⅔ of the radial lobes. The circumferential lobes significantly increase the ratio of wetted area of the passageways of the mixer to the cross sectional areas of the mixer.

The invention is described in more detail below with reference to the attached drawings.

DETAILED DESCRIPTION OF THE INVENTION

Figure 1:
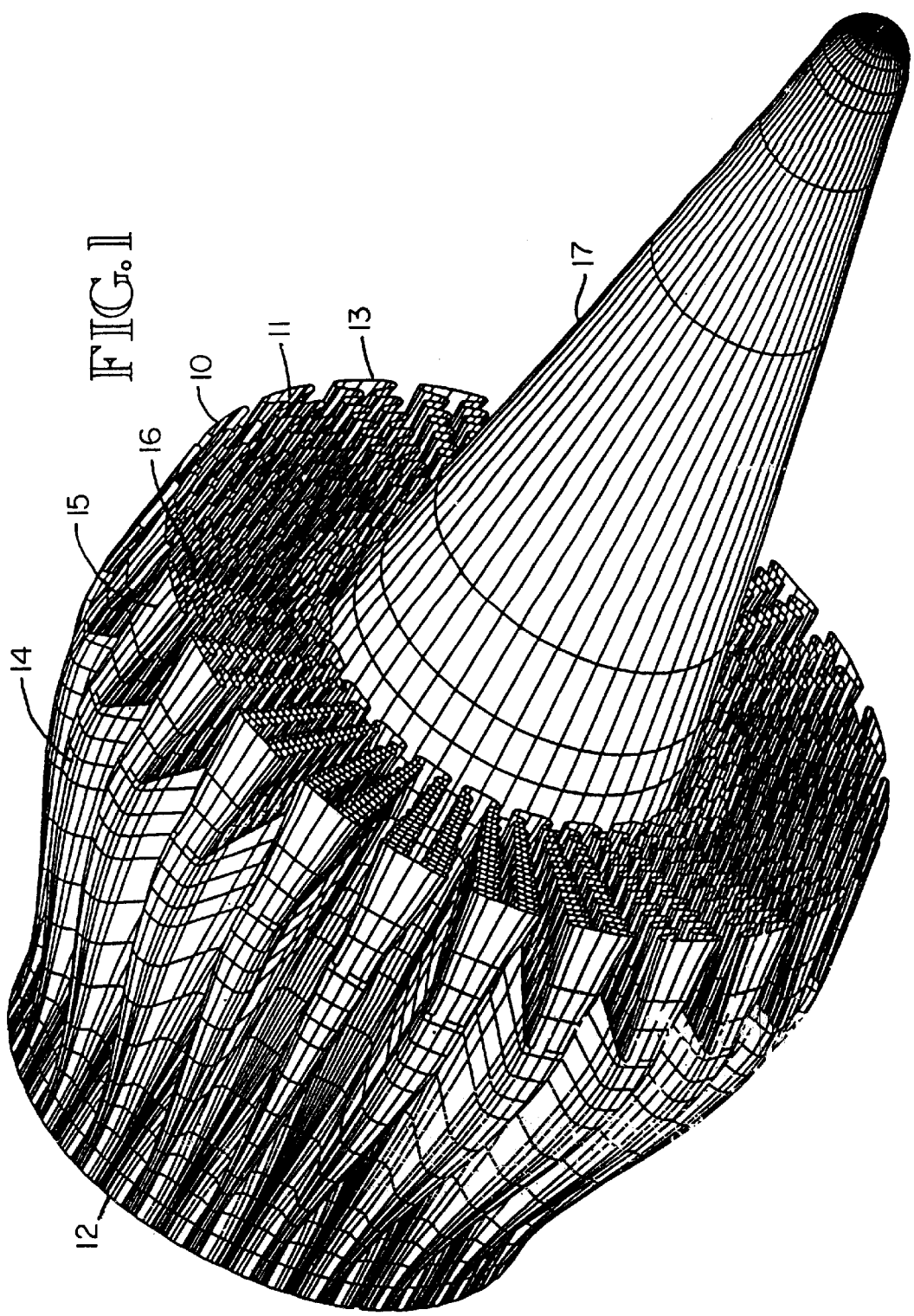
FIG. 1 is a perspective view of an example embodiment of the subject invention.
Figure 2:
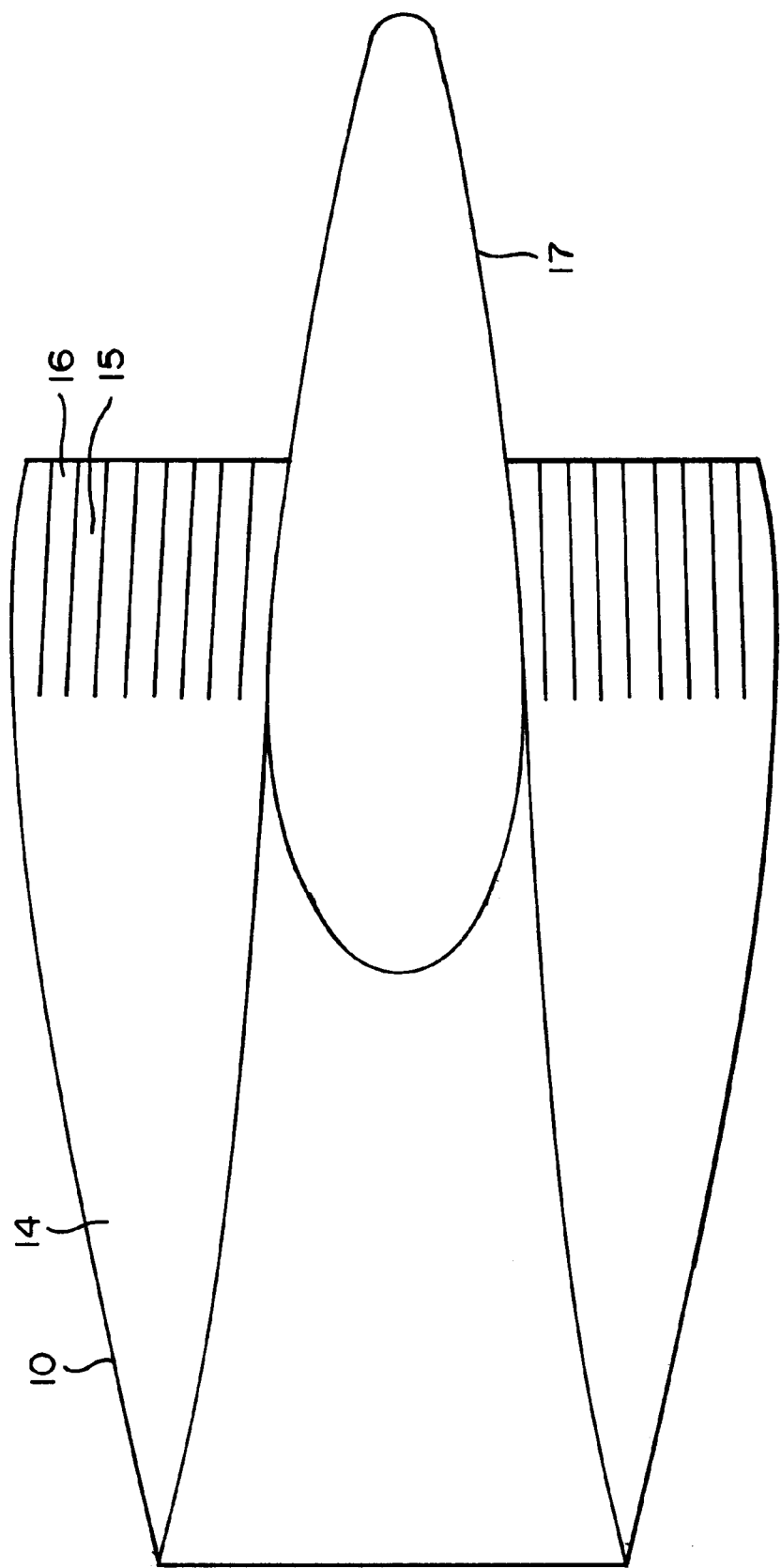
FIG. 2 is a schematic cross section of the mixer taken on a plane through its centerline.

The subject invention is a noise suppressing mixer for jet engines. FIG. 1 illustrates an example embodiment of the invention. Mixer 10 comprises a plurality of radial lobes, lobe 11 being typical. Forward end 12 of the mixer is circular and the lobes increase in height and width toward the exit end 13 of the mixer. The forward portions of the lobes, forward portion 14 being typical, are conventional. The aft portions, aft portion 15 being typical, comprise between 10% and 60% of the lengths of the lobes. The sides of the aft portions sides 15' and 15" (FIG. 3) being typical comprise circumferential lobes, lobe 16 being typical. The circumferential dimensions of these lobes, i.e. their depths depth d (FIG. 3) being typical are zero at their forward ends and increase toward the aft end of the mixer exit end 13 being the aft end. The term "circumferential" means oriented in a direction perpendicular to a radius and/or parallel to the circumference of the mixer. The term radius means a distance from the centerline of the mixer and the term "radial" means extending toward and/or away from the center of the mixer. These depths may be the same for all the lobes in a side or they may increase with radial distance of a lobe from the center of the mixer. The number of radial and circumferential lobes and their configurations are determined based on structural and functional design considerations and on manufacturing cost considerations. The maximum radial dimensions of the circumferential lobes, i.e. their maximum widths width w (FIG. 3) being typical are in a range of 0.015 to 0.15 of the maximum radius of the mixer, a range of 0.03 to 0.06 being preferred. In the FIG. 1 embodiment a plug 17 occupies the central volume of the mixer. The circumferential dimension, i.e. depth depth d' (FIG. 3) being typical of the circumferential lobes is a range of 0.1 to 0.5 of the width of the radial lobes width W being typical. FIG. 2 is a schematic cross section of the FIG. 1 embodiment of the mixer including a plug, with parts numbered as in FIG. 1.

Figure 3:
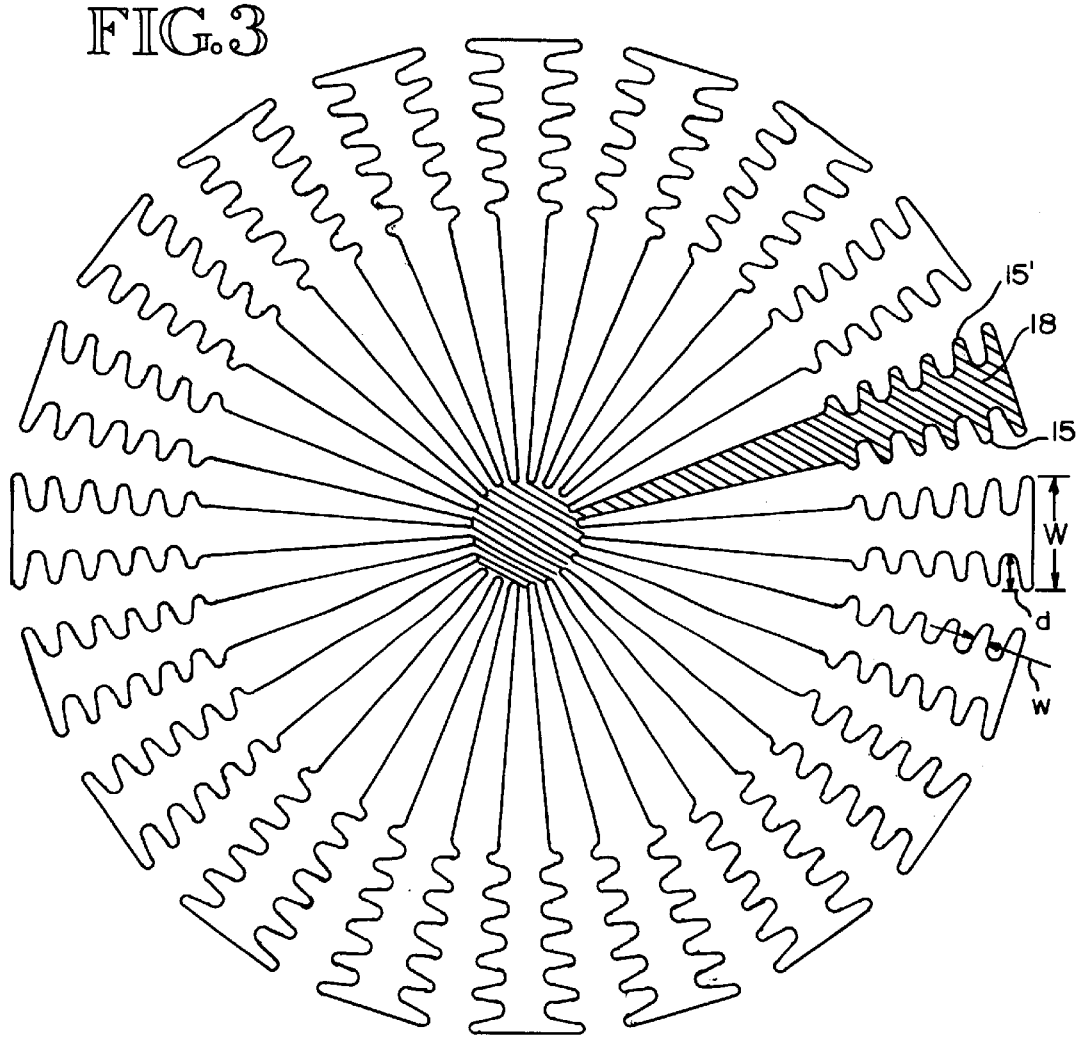
FIG. 3 is a cross section taken perpendicular to the axis of a mixer without a plug and near the exit end of the mixer.

FIG. 3 is a schematic section taken perpendicular to the axis of a mixer without a plug and near the exit end of the mixer. Lobe 18 is a typical lobe. The hatching distinguishes the interior of the lobe and the central, unlobed portion of the mixer in the plane of the section.

Figure 4:
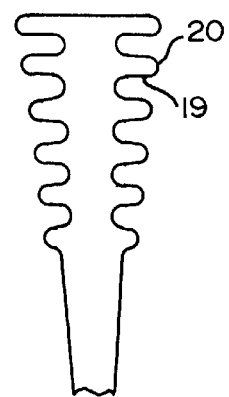
FIG. 4 illustrates a second alternate circumferential lobe configuration.
Figure 5:
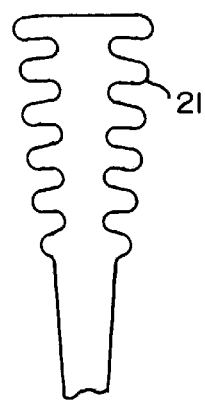
FIG. 5 illustrates a third alternate circumferential lobe configuration.

In this embodiment the directions of the planes of symmetry of the circumferential lobes have a radially outward component rather than being tangential. FIGS. 4 and 5 illustrate alternate circumferential lobe configurations. In FIG. 4 the direction of the plane of symmetry of lobe 19 is tangential to a circle through its apex 20 and centered at the centerline of the mixer. In FIG. 5 the directions of the planes of symmetry of the circumferential lobes, lobe 21 being typical, have a radially inward component.

Figure 6:
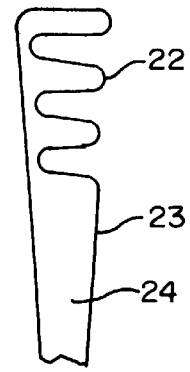
FIG. 6 illustrates an alternate radial lobe/circumferential lobe configuration.

FIG. 6 illustrates an alternate radial lobe/circumferential lobe configuration in which there are circumferential lobes, lobe 22 being typical, in only one side, side 23 being typical of radial lobe 24. In this configuration the depth of the circumferential lobes are in a range of 0.2 to 0.95 of the width of the radial lobe.

It is considered to be understandable from this description that the subject invention meets its objectives. It provides a noise suppressing mixer for jet engines, the mixer having high ratios of wetted areas to cross sectional areas of its passageways and having corrugations, in the passageways, having relatively small dimensions relative to the radius of the mixer.

It is also considered to be understood that while certain embodiments of the invention are disclosed herein, other embodiments and modifications of those disclosed are possible within the scope of the invention which is limited only by the attached claims.

I claim:

1. A noise suppressing mixer for a jet engine, said mixer comprising a plurality of radial lobes, each of said radial lobes having a first side and a second side, each of said sides having an aft portion and a plurality of circumferential lobes in said aft portion of at least one of said sides.

2. The mixer of claim 1 in which said mixer has a maximum radius and each of said circumferential lobes has a maximum width and said maximum width is in a range of 0.015 to 0.15 of said maximum radius.

3. The mixer of claim 2 in which said maximum width is in a range of 0.025 to 0.050 of said maximum radius.

4. The mixer of claim 1 in which each of said radial lobes has a maximum width and each of said circumferential lobes has a depth and said depth is in a range of 0.015 to 0.95 of said width.

5. The mixer of claim 2 in which each of said radial lobes has a width and each of said circumferential lobes has a depth and said depth is in a range of 0.015 to 0.95 of said width.

6. The mixer of claim 3 in which each of said radial lobes has a width and each of said circumferential lobes has a depth and said depth is in a range of 0.015 to 0.95 of said width.

\* \* \* \* \*